US012188713B2

(12) United States Patent
Je et al.

(10) Patent No.: US 12,188,713 B2
(45) Date of Patent: Jan. 7, 2025

(54) REFRIGERATOR

(71) Applicant: Samsung Electronics Co., Ltd., Suwon-si (KR)

(72) Inventors: Sang Ky Je, Suwon-si (KR); Jang Yong Cha, Suwon-si (KR); Gwang Chel Jeong, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 708 days.

(21) Appl. No.: 17/423,790

(22) PCT Filed: Oct. 21, 2019

(86) PCT No.: PCT/KR2019/013813
§ 371 (c)(1),
(2) Date: Jul. 16, 2021

(87) PCT Pub. No.: WO2020/149498
PCT Pub. Date: Jul. 23, 2020

(65) Prior Publication Data
US 2022/0120493 A1 Apr. 21, 2022

(30) Foreign Application Priority Data
Jan. 16, 2019 (KR) .......... 10-2019-0005698

(51) Int. Cl.
F25D 23/06 (2006.01)
F16B 5/06 (2006.01)
(Continued)

(52) U.S. Cl.
CPC .......... *F25D 23/067* (2013.01); *F16B 5/0664* (2013.01); *F25D 31/005* (2013.01);
(Continued)

(58) Field of Classification Search
CPC .. F25D 23/067; F25D 31/005; F25D 2400/02; F25D 2400/40; F16B 5/0664;
(Continued)

(56) References Cited

U.S. PATENT DOCUMENTS 2,609,472 A * 9/1952 Schultz ............... F25D 21/08
D15/89
3,433,030 A * 3/1969 Jacobs ............... F25C 1/08
62/347

(Continued)

FOREIGN PATENT DOCUMENTS

JP 2008-198538 8/2008
JP 5694824 2/2015

(Continued)

OTHER PUBLICATIONS

Office Action dated Jul. 19, 2023 issued in Korean Application No. 10-2019-0005698.

(Continued)

*Primary Examiner* — Jimmy Chou
(74) *Attorney, Agent, or Firm* — STAAS & HALSEY LLP

(57) ABSTRACT

A refrigerator includes a main body and a storage compartment provided inside the main body. A heater assembly partitions the storage compartment into a first storage compartment and a second storage compartment. The heater assembly includes a first case provided to define a surface of the first storage compartment, a second case coupled to the first case to form an accommodation space with the first case and provided to define a surface of the second storage compartment, a fixing unit formed on at least one of an inner surface of the first case and an inner surface of the second case, and a surface heater fixed to at least one of the inner surface of the first case and the inner surface of the second (Continued)

case by being coupled to the fixing unit. The surface heater includes a film and a heating wire printed on the film.

7 Claims, 7 Drawing Sheets

(51) Int. Cl.
  *F25D 31/00* (2006.01)
  *H05B 3/06* (2006.01)
(52) U.S. Cl.
  CPC ........ *H05B 3/06* (2013.01); *F16B 2005/0678* (2013.01); *F25D 2400/02* (2013.01); *F25D 2400/40* (2013.01); *H05B 2203/017* (2013.01)
(58) Field of Classification Search
  CPC .............. F16B 2005/0678; H05B 3/06; H05B 2203/017
  USPC ........................................................ 219/201
  See application file for complete search history.

(56) References Cited

U.S. PATENT DOCUMENTS

| | | | | |
|---|---|---|---|---|
| 3,751,629 A * | 8/1973 | Eisler | ........................ | F24C 7/00 426/243 |
| 4,374,312 A * | 2/1983 | Damron | .................... | H05B 3/26 392/435 |
| 4,488,817 A * | 12/1984 | Uesaka | ............... | B01F 33/5011 220/592.13 |
| 4,626,667 A * | 12/1986 | Asano | ....................... | H05B 3/32 219/461.1 |
| 4,691,486 A * | 9/1987 | Niekrasz | ............... | A47F 3/0434 219/547 |
| 5,186,022 A * | 2/1993 | Kim | ........................ | F25B 39/02 62/515 |
| 5,198,640 A * | 3/1993 | Yang | .................... | H01C 1/1406 219/505 |
| 5,966,951 A | 10/1999 | Hallin et al. | | |
| 9,285,160 B1 * | 3/2016 | Kang | ...................... | F25D 25/025 |
| 9,618,402 B2 | 4/2017 | Kwon et al. | | |
| 2006/0248916 A1 * | 11/2006 | Kim | ....................... | F25D 25/025 62/187 |
| 2008/0083733 A1 * | 4/2008 | Takai | ...................... | H05B 3/265 219/448.17 |
| 2010/0275631 A1 | 11/2010 | Wiest et al. | | |
| 2010/0288752 A1 * | 11/2010 | Lee | ........................... | H05B 3/24 219/544 |
| 2012/0260690 A1 * | 10/2012 | Miyamoto | ............... | F25D 21/08 219/539 |
| 2013/0220987 A1 * | 8/2013 | Himeno | .................. | F24H 9/146 219/202 |
| 2014/0014644 A1 | 1/2014 | Akiba et al. | | |
| 2014/0021193 A1 * | 1/2014 | Chao | ...................... | H05B 3/145 219/536 |
| 2015/0110934 A1 * | 4/2015 | Taylor | ...................... | A61L 9/015 99/534 |
| 2015/0219383 A1 | 8/2015 | Wahlby et al. | | |
| 2017/0059224 A1 * | 3/2017 | Bae | ........................ | F25D 17/062 |

FOREIGN PATENT DOCUMENTS

| | | | | |
|---|---|---|---|---|
| KR | 20-0270229 | 3/2002 | | |
| KR | 10-2004-0108066 | 12/2004 | | |
| KR | 200416795 Y1 * | 5/2006 | ........... | A47F 3/0469 |
| KR | 10-2008-0018762 | 2/2008 | | |
| KR | 10-2010-0037194 | 4/2010 | | |
| KR | 10-2015-0146357 | 12/2015 | | |
| KR | 10-2018-0028572 | 3/2018 | | |
| KR | 10-2018-0136060 | 12/2018 | | |

OTHER PUBLICATIONS

International Search Report, dated Feb. 25, 2020, in International Application No. PCT/KR2019/013813 (2 pp.).
Office Action dated Jan. 4, 2024 issued in Korean Application No. 10-2019-005698.

* cited by examiner

REFRIGERATOR

CROSS-REFERENCE TO RELATED APPLICATIONS

This application is a U.S. national stage of International Application No. PCT/KR2019/013813, filed on Oct. 21, 2019. The International Application claims the priority benefit of Korean Patent Application No. 10-2019-0005698 filed on Jan. 16, 2019. Both International Application No. PCT/KR2019/013813 and Korean Patent Application No. 10-2019-0005698 are incorporated by reference herein in their entirety.

BACKGROUND

1. Field

The disclosure relates to a refrigerator, and more particularly, to a refrigerator including a surface heater.

2. Description of Related Art

A refrigerator is a home appliance that keeps food fresh by including a main body including a storage compartment, a cool air supply configured to supply cold air to the storage compartment, and a door configured to open and close the storage compartment.

Recently, a kimchi refrigerator has become more popular, and by using the principle of a refrigerator, the kimchi refrigerator is configured to store moderately fermented kimchi for a relatively long time, and further configured to allow a user to adjust a temperature thereof so as to automatically ferment kimchi for the taste of the user and configured to maintain the taste for a relatively long time.

The kimchi refrigerator may have a fermentation function for fermenting kimchi. In general, the fermentation function of the kimchi refrigerator may be implemented through a cord heater. The cord heater may include an aluminum foil to which a heating wire is attached. The aluminum foil of the cord heater may be attached to a wall that forms a fermentation compartment of the kimchi refrigerator by a double-sided tape. The aluminum foil forming the cord heater may be easily deformed by folding or the like, and may not be properly adhered to the wall of the fermentation compartment. The deformation or lifting of the cord heater may cause a difficulty in that a foam liquid leaks to between the cord heater and the wall of the fermentation compartment, thereby reducing the fermentation efficiency of the fermentation compartment.

In addition, a process of installing the cord heater to the fermentation compartment requires a large number of workers, and an operation is also not simple, which may lead to a decrease in productivity.

SUMMARY

One aspect of the disclosure provides a refrigerator including a main body, a storage compartment provided inside the main body, the storage compartment including a first storage compartment and a second storage compartment adjacent to the first storage compartment, and a heater assembly provided to partition the storage compartment into the first storage compartment and the second storage compartment. The heater assembly includes a first case provided to define one surface of the first storage compartment, a second case coupled to the first case to form an accommodation space with the first case and provided to define one surface of the second storage compartment, a fixing unit formed on at least one of an inner surface of the first case and an inner surface of the second case, and a surface heater fixed to at least one of the inner surface of the first case and the inner surface of the second case by being coupled to the fixing unit, the surface heater including a film and a heating wire printed on the film.

The first case and the second case may include an injection molded product.

The surface heater may further include a plurality of fixing holes formed in each corner of the surface heater to be coupled to the fixing unit.

The fixing unit may include a plurality of fixing units integrally formed with at least one of the first case and the second case to allow the plurality of fixing holes of the surface heater to be coupled thereto. The plurality of fixing holes of the surface heater may be coupled to the plurality of fixing units in a sliding manner.

Each of the plurality of fixing units may include a body provided to extend from the at least one of the inner surface of the first case and the inner surface of the second case, a first wing provided to extend from the body to face an outside of the accommodation space and spaced apart from the at least one of the inner surface of the first case and the inner surface of the second case from which the body extends, and a second wing provided to extend from the body to face an inside of the accommodation space and spaced apart from the at least one of the inner surface of the first case and the inner surface of the second case from which the body extends.

A distance d1 between the at least one of the inner surface of the first case and the inner surface of the second case from which the body extends, and the first wing may be less than a distance d2 between the at least one of the inner surface of the first case and the inner surface of the second case from which the body extends, and the second wing.

The surface heater may further include a fixing hole edge provided to define each of the plurality of fixing holes. A separation of the surface heater from the plurality of fixing units may be limited by interference between any one of the first and second wings of the plurality of fixing units and the fixing hole edge of the surface heater.

The fixing unit may include a plurality of fixing units integrally formed with at least one of the first case and the second case to allow the plurality of fixing holes of the surface heater to be coupled thereto. The plurality of fixing holes of the surface heater may be through-coupled to the plurality of fixing units.

A width w1 of the plurality of fixing holes may be less than a width w2 of the plurality of fixing units to allow the plurality of fixing units to be elastically deformed and to be through-coupled to the plurality of fixing holes.

Each of the plurality of fixing units may include a body provided to extend from at least one of the inner surface of the first case and the inner surface of the second case and a head provided to extend from the body to have a width wh greater than a width wb of the body.

The surface heater may further include a fixing hole edge provided to define each of the plurality of fixing holes. A separation of the surface heater from the plurality of fixing units may be limited by interference between the head of the plurality of fixing units and the fixing hole edge of the surface heater.

Each of the plurality of fixing units may include a hollow.

The heater assembly may further include an insulating material filled in the accommodation space to allow the surface heater to be in close contact with at least one of the inner surface of the first case and the inner surface of the second case.

The insulating material may include expanded polystyrene.

Another aspect of the disclosure provides a refrigerator including a main body, a storage compartment provided inside the main body, and a heater assembly configured to partition and heat the storage compartment. The heater assembly includes a first case, a second case coupled to the first case to form an accommodation space with the first case, and a surface heater fixed to at least one of an inner surface of the first case and an inner surface of the second case, the surface heater including a film and a heating wire printed on the film.

The refrigerator may further include a fixing unit integrally formed with at least one of the first case and the second case so as to fix the surface heater to the at least one of the inner surface of the first case and the inner surface of the second case.

The fixing unit may include a body provided to extend from at least one of the inner surface of the first case and the inner surface of the second case, a first wing provided to extend from the body to face an outside of the accommodation space and spaced apart from the at least one of the inner surface of the first case and the inner surface of the second case from which the body extends, and a second wing provided to extend from the body to face an inside of the accommodation space and spaced apart from the at least one of the inner surface of the first case and the inner surface of the second case from which the body extends.

The fixing unit may include a body provided to extend from at least one of the inner surface of the first case and the inner surface of the second case, a head provided to extend from the body to have a width wh greater than a width wb of the body, and a hollow formed over the head and the body.

BRIEF DESCRIPTION OF THE DRAWINGS

The above and other aspects, features and advantages of the disclosure will become more apparent from the following description of example embodiments with reference to the accompanying drawings, in which.

DETAILED DESCRIPTION

Hereinafter, example embodiments of the disclosure will be described in detail with reference to the accompanying drawings. On the other hand, In the following detailed description, the terms of "front end", "rear end", "upper portion", "lower portion", "upper end", "lower end" and the like may be defined by the drawings, but the shape and the location of the component is not limited by the term.

Hereinafter "X" refers to a front and rear direction of a refrigerator 1, "Y" refers to a left and right direction of the refrigerator 1, and "Z" refers to an up and down direction of the refrigerator 1.

The disclosure is directed to providing a refrigerator including an improved structure to improve heat transfer efficiency.

Further, the disclosure is directed to providing a refrigerator including an improved structure to improve workability of installation of a heater.

By fixing a surface heater to at least one of an inner surface of a first case and an inner surface of a second case using a fixing unit without a separate adhesive, it is possible to prevent a foam liquid from leaking to between the surface heater and the at least one of the inner surface of the first case and the inner surface of the second case to which the surface heater is fixed, and it is possible to improve workability of installation of the surface heater.

Figure 1:
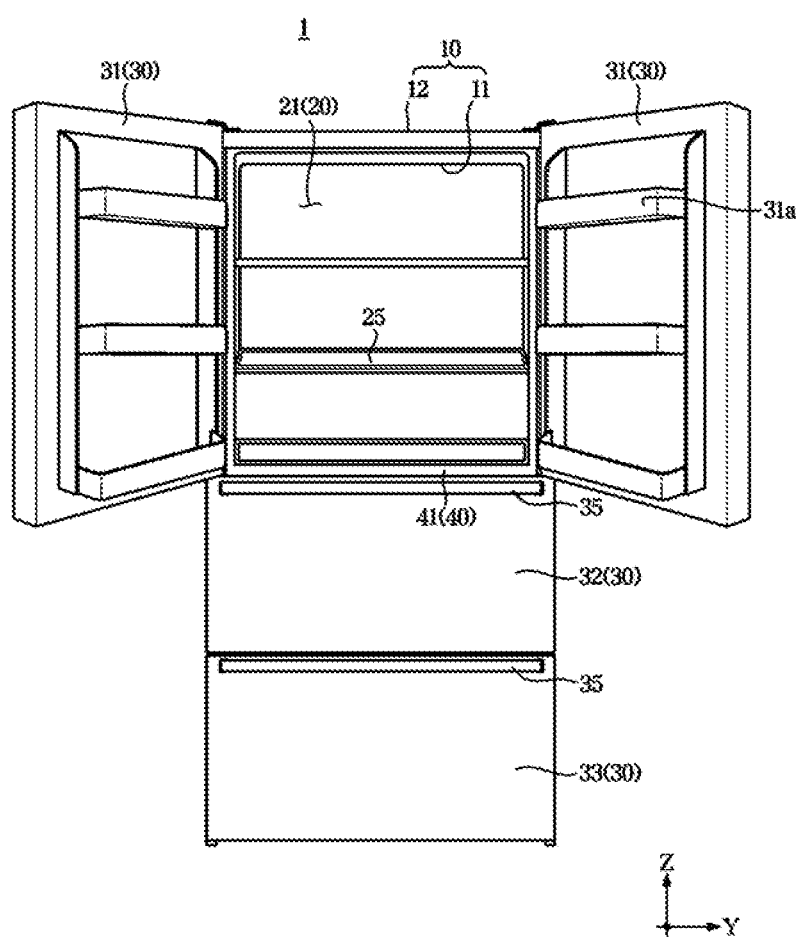
FIG. 1 is a view illustrating a refrigerator according to an embodiment of the disclosure.
Figure 2:
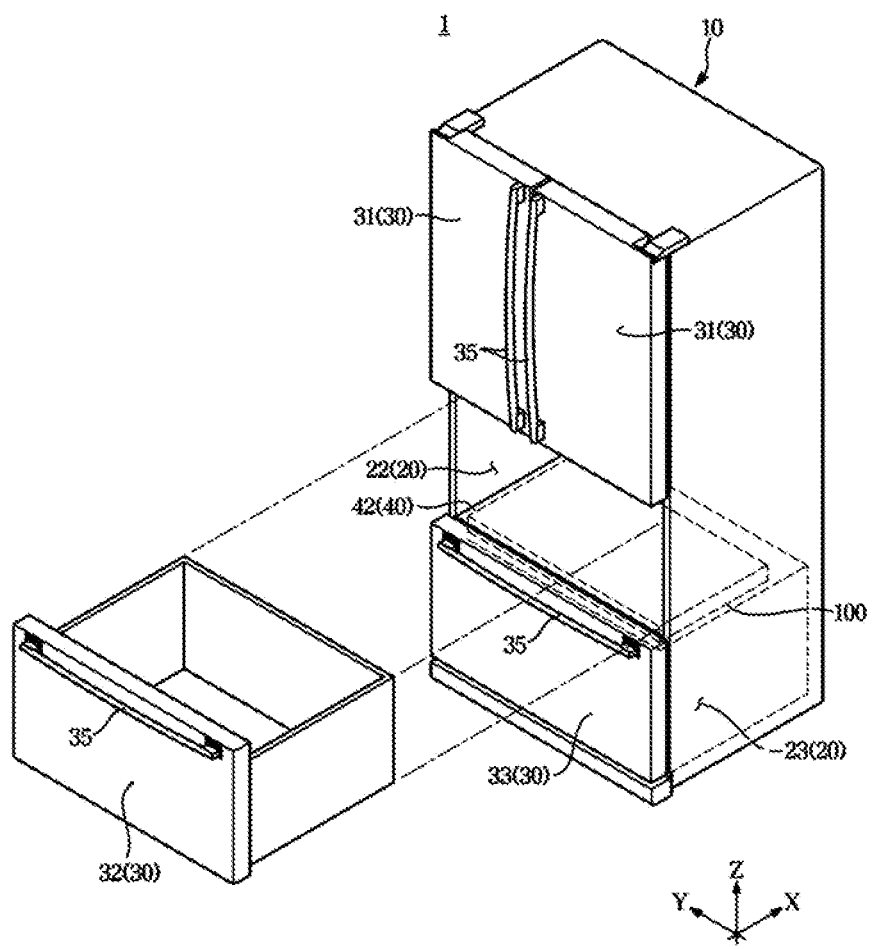
FIG. 2 is a view illustrating a state in which a second door is separated from a main body in the refrigerator according to an embodiment of the disclosure.

FIG. 1 is a view illustrating a refrigerator according to one embodiment of the disclosure, and FIG. 2 is a view illustrating a state in which a second door is separated from a main body in the refrigerator according to one embodiment of the disclosure.

As illustrated in FIGS. 1 and 2, the refrigerator 1 may include a main body 10, a storage compartment 20 provided inside the main body 10.

The main body 10 may include an inner case 11 forming the storage compartment 20 and an outer case 12 forming an exterior of the refrigerator 1. Between the inner case 11 and the outer case 12 of the main body 10, an insulating material (not shown) may be foamed to prevent cold air from leaking out of the storage compartment 20.

The storage compartment 20 may include an open front surface.

The refrigerator 1 may further include a door 30 configured to open and close the storage compartment 20. The door 30 may be configured to open and close the open front surface of the storage compartment 20.

The refrigerator 1 may further include a cold air supply (not shown) configured to supply cold air to the storage compartment 20. The cold air supply may include a compressor (not shown), a condenser (not shown), an expansion valve (not shown), an evaporator (not shown), a blowing fan (not shown), and a cold air duct (not shown).

A machine room (not shown) in which the compressor configured to compress the refrigerant and the condenser configured to condense the compressed refrigerant are installed may be provided at a rear lower side of the main body 10.

The refrigerator 1 may further include a partition wall 40 provided to partition the storage compartment 20. The storage compartment 20 may be divided into a plurality of spaces by the partition wall 40. As an example, the storage compartment 20 may include a first storage compartment 21, a second storage compartment 22, and a third storage compartment 23 that are partitioned in the up and down direction Z of the refrigerator 1 by the partition wall 40. The first storage compartment 21, the second storage compartment 22, and the third storage compartment 23 each may form an independent storage space, and a storage temperature of each storage compartment 20 may be regulated independently of each other according to an amount of cold air supplied to each storage compartment 20. As an example, in a case in which the refrigerator 1 of the disclosure is a kimchi refrigerator configured to store kimchi, the first storage compartment 21 may be used as a refrigerating storage compartment configured to store kimchi in a refrigeration manner, and the second storage compartment 22 and the third storage compartment 23 may be used as a fermentation compartment configured to ferment kimchi. However, the use and arrangement of the first storage compartment 21, the second storage compartment 22, and the third storage compartment 23 are not limited thereto and may vary according to the type of the refrigerator.

The partition wall 40 may include a first partition wall 41 provided to define the first storage compartment 21 and the second storage compartment 22, and a second partition wall 42 provided to define the second storage compartment 22 and the third storage compartment 23. Any one of the first partition wall 41 and the second partition wall 42 may heat the storage compartment 20 while partitioning the storage compartment 20. In other words, any one of the first partition wall 41 and the second partition wall 42 may be implemented as a heater assembly 100 to be described later. In a case in which the second storage compartment 22 and the third storage compartment 23 of the disclosure are used as fermentation compartments configured to ferment kimchi, the second partition wall 42 may be implemented as the heat assembly 100 so as to heat the second storage compartment 22 and the third storage compartment 23 while defining the second storage compartment 22 and the third storage compartment 23.

A plurality of shelves 25 may be provided in the first storage compartment 21 to divide the first storage compartment 21 into a plurality of regions.

The door 30 may include a first door 31 configured to open and close the first storage compartment 21, a second door 32 configured to open and close the second storage compartment 22, and a third door 33 configured to open and close the third storage compartment 23. The first door 31 may be rotatably installed on the main body 10 to open and close the first storage compartment 21. The second door 32 may be slidably installed on the main body 10 to open and close the second storage compartment 22. The third door 33 may be slidably installed on the main body 10 to open and close the third storage compartment 23. That is, the first door 31 may be implemented as a rotatable door, and the second door 32 and the third door 33 may be implemented as a drawer-type door.

A plurality of door guards 31a may be provided on a rear surface of the first door 31 to accommodate food.

A handle 35 may be provided at the first door 31, the second door 32, and the third door 33 to allow a user to easily open and close the storage compartment 20.

The refrigerator 1 may further include the heater assembly 100 configured to heat the storage compartment 20. The heater assembly 100 may be provided to partition the storage compartment 20. Particularly, the heater assembly 100 may act as the second partition wall 42. In the case in which the second storage compartment 22 and the third storage compartment 23 according to the disclosure are used as the fermentation compartment configured to ferment kimchi, the second partition wall 42 provided to define the second storage compartment 22 and the third storage compartment 23 may be implemented as the heater assembly 100 configured to heat the second storage compartment 22 and the third storage compartment 23 to allow the second storage compartment 22 and the third storage compartment 23 to have a temperature suitable for fermenting the kimchi. However, it is sufficient that the heater assembly 100 is disposed to heat the storage compartment used as the fermentation compartment, and thus the arrangement position of the heater assembly 100 is not limited thereto. As an example, the heater assembly 100 may be disposed to surround at least one surface of the storage compartment between inner and outer walls forming the storage compartment used as the fermentation compartment. Further, the heater assembly 100 may be disposed inside the partition wall defining the storage compartment used as the fermentation compartment.

The refrigerator 1 may include at least one heater assembly 100. That is, the refrigerator 1 may include a single heater assembly or a plurality of heater assemblies.

Hereinafter a case in which the second partition wall 42 is implemented as the heater assembly 100 will be mainly described. That is, a case in which the heater assembly 100 heats the second storage compartment 22 and the third storage compartment 23 while defining the second storage compartment 22 and the third storage compartment 23, acting as the second partition wall 42 will be mainly described.

Figure 3:
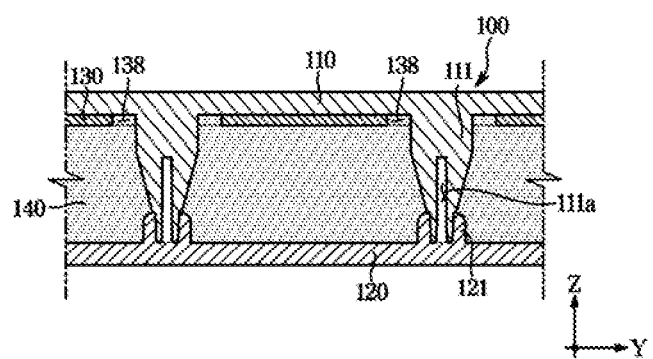
FIG. 3 is a cross-sectional view illustrating a heater assembly of the refrigerator according to an embodiment of the disclosure.
Figure 4:
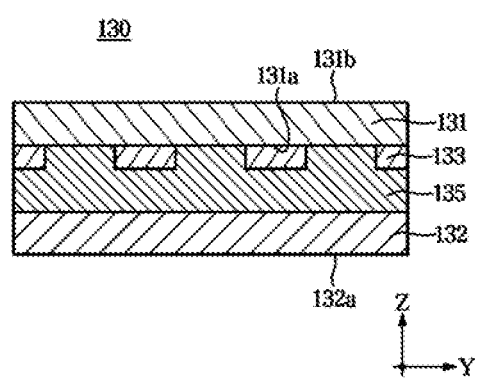
FIG. 4 is a cross-sectional view illustrating a surface heater of the heater assembly of the refrigerator according to an embodiment of the disclosure.

FIG. 3 is a cross-sectional view illustrating a heater assembly of the refrigerator according to one embodiment of the disclosure, and FIG. 4 is a cross-sectional view illustrating a surface heater of the heater assembly of the refrigerator according to one embodiment of the disclosure.

As illustrated in FIGS. 3 and 4, the heater assembly 100 may include a first case 110 and a second case 120 provided to form an exterior of the heater assembly 100 together with the first case 110. The first case 110 and the second case 120 may be coupled to each other to form an accommodation space therein. Particularly, the first case 110 and the second case 120 may be coupled to each other by coupling between a coupling protrusion 111 formed on any one of the first case 110 and the second case 120, and a coupling groove 121 formed on the other one of the first case 110 and the second case 120. The coupling protrusion 111 may be integrally formed with any one of the first case 110 and the second case 120, and the coupling groove 121 may be integrally formed with the other one of the first case 110 and the second case 120. The coupling protrusion 111 may include a hollow 111a. In a case in which the coupling protrusion 111 includes the hollow 111a, the coupling protrusion 111 may be elastically deformable, and thus easily coupled to the coupling groove 121.

The first case 110 may be provided to define one surface of the second storage compartment 22. Particularly, the first case 110 may be provided to define a bottom surface of the second storage compartment 22. The second case 120 may be provided to define one surface of the third storage compartment 23 adjacent to the second storage compartment 22. Particularly, the second case 120 may be provided to define an upper surface of the third storage compartment 23 positioned below the second storage compartment 22.

The first case 110 and the second case 120 may include an injection molded product.

The heater assembly 100 may further include a fixing unit 150 (refer to FIG. 5) formed on at least one of an inner surface of the first case 110 and an inner surface of the second case 120. The fixing unit 150 may be integrally formed with at least one of the first case 110 and the second case 120. However, it is not required that the fixing unit 150 is integrally formed with at least one of the first case 110 and the second case 120, and thus the fixing unit 150 may be formed separately from the first case 110 and the second case 120 and then coupled to at least one of the first case 110 and the second case 120. It is appropriate that the heater assembly 100 includes a plurality of fixing units 150. A detailed description of the fixing unit 150 will be described later.

The heater assembly 100 may further include a surface heater 130 fixed to at least one of the inner surface of the first case 110 and the inner surface of the second case 120 by the fixing unit 150. The surface heater 130 may be fixed to at least one of the inner surface of the first case 110 and the inner surface of the second case 120 by being coupled to the fixing unit 150. It is appropriate that the surface heater 130 includes a first surface heater fixed to the inner surface of the first case 110 by being coupled to the fixing unit 150, and a second surface heater fixed to the inner surface of the second case 120 by being coupled to the fixing unit 150.

The surface heater 130 may include a film. The film may be formed of a polyethylene terephthalate (PET) material. The film may include a first film 131 and a second film 132 that form an outer surface of the surface heater 130 and are positioned on opposite sides of each other. Particularly, the film may include the first film 131 including a case-corresponding surface 131b facing at least one of the inner surface of the first case 110 and the inner surface of the second case 120, and the second film 132 including an insulating material-corresponding surface 132a facing an insulating material 140 filled in the accommodation space. The case-corresponding surface 131b of the first film 131 may be in contact with at least one of the inner surface of the first case 110 and the inner surface of the second case 120 on which the first film 131 is seated. The insulating material-corresponding surface 132a of the second film 132 may be in contact with the insulating material 140.

The surface heater 130 may further include a heating wire 133 formed on the film. Particularly, the heating wire 133 may be printed on the first film 131. More particularly, the first film 131 may further include a heating wire forming surface 131a positioned on the opposite side of the case-corresponding surface 131b, and the heating wire 133 may be printed on the heating wire forming surface 131a through gravure printing. The heating wire 133 may include a silver (Ag) material. The heating wire 133 may be configured to generate heat by receiving a current.

The surface heater 130 may further include an adhesive member 135 provided to bond the first film 131, on which the heating wire 133 is printed, and the second film 132 to each other. As an example, the adhesive member 135 may include a double-sided tape.

The surface heater 130 may further include a terminal (not shown) configured to supply a current to the heating wire 133 from an external power source (not shown).

The heater assembly 100 may further include the insulating material 140 filled in the accommodation space to allow the surface heater 130 to be in close contact with at least one of the inner surface of the first case 110 and the inner surface of the second case 120. The insulating material 140 may include expanded polystyrene (EPS). The insulating material 140 may be foamed in the accommodation space. In addition, the heat insulating material 140 may be manufactured to have a certain shape and then stacked in the accommodation space. Types of the insulating material 140 is not limited thereto, and thus types of the insulating material 140 may vary. As an example, the insulating material 140 may include polyurethane foam.

The surface heater 130 may be fixed to at least one of the inner surface of the first case 110 and the inner surface of the second case 120 by the fixing unit 150. Particularly, the surface heater 130 may be fixed to at least one of the inner surface of the first case 110 and the inner surface of the second case 120 by being coupled to the fixing unit implemented in various forms. Accordingly, in a process of fixing the surface heater 130 to at least one of the inner surface of the first case 110 and the inner surface of the second case 120, an adhesive such as a double-sided tape is not required.

In the case of using the cord heater including an aluminum foil, to which a heating wire is attached, as one component of the heater assembly 100 instead of using the surface heater 130, it is required to remove a piece of release paper from the aluminum foil so as to allow an adhesive surface of the aluminum foil to be exposed in a process of attaching the cord heater to at least one of the inner surface of the first case 110 and the inner surface of the second case 120. The aluminum foil is easy to deform due to the nature of the material, and when the deformed aluminum foil is attached to at least one of the inner surface of the first case 110 and the inner surface of the second case 120, the aluminum foil is lifted and thus a foam liquid may leak to between the at least one of the inner surface of the first case 110 and the inner surface of the second case 120, and the cord heater. When the foam liquid leaks to between the at least one of the inner surface of the first case 110 and the inner surface of the second case 120, and the cord heater, the foam liquid may prevent heat, which is generated by the cord heater, from being transferred to the inside of the storage compartment through the at least one of the inner surface of the first case 110 and the inner surface of the second case 120 to which the cord heater is attached. Therefore, when the cord heater is attached to the at least one of the inner surface of the first case 110 and the inner surface of the second case 120 after removing the release paper from the aluminum foil, workers need to pay close attention. Particularly, the aluminum foil is easily folded or torn in the process of removing the release paper from the aluminum foil to allow the adhesive surface to be exposed. In order to prevent the aluminum foil of the cord heater from being deformed, at least two skilled workers and a relatively long working time are required. However, it is possible to reduce the difficulties, which is to be taken by using the cord heater, by replacing the cord heater with the surface heater 130, and by fixing the surface heater 130 to at least one of the inner surface of the first case 110 and the inner surface of the second case 120 through the fixing unit instead of the adhesive. Hereinafter various methods of fixing the surface heater 130 to at least one of the inner surface of the first case 110 and the inner surface of the second case 120 using the fixing unit will be described in detail.

Figure 5:
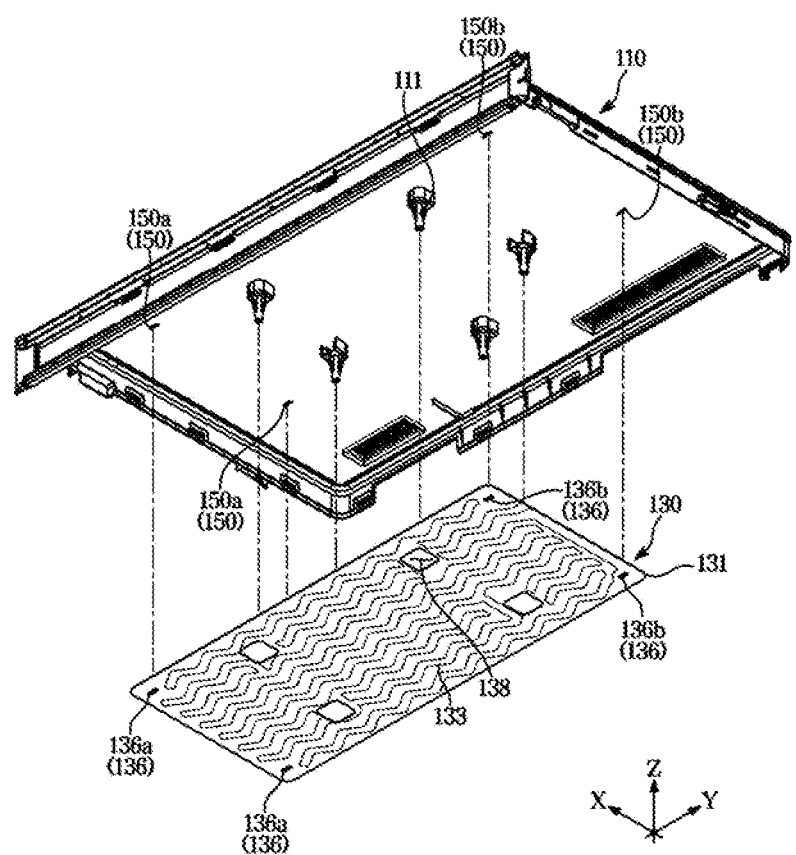
FIG. 5 is an exploded perspective view illustrating the heater assembly of the refrigerator according to an embodiment of the disclosure.
Figure 6:
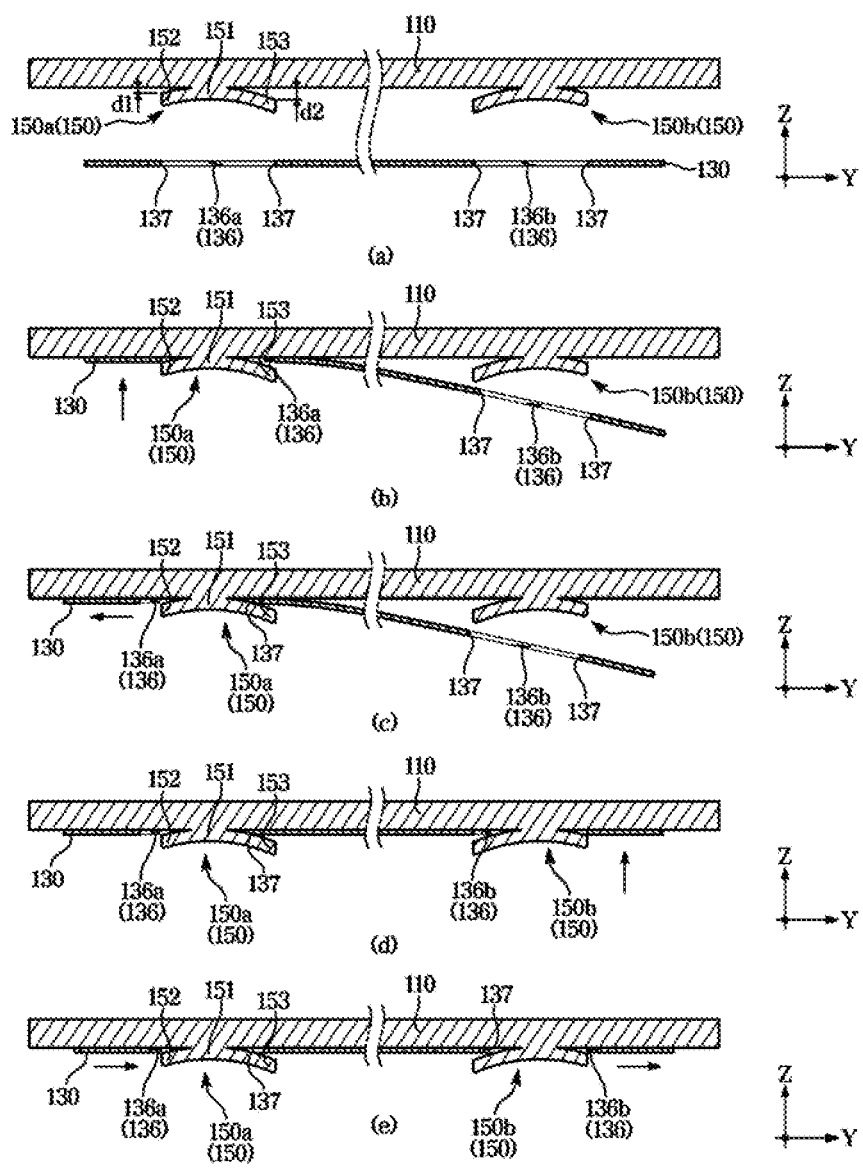
FIG. 6 is a view illustrating a process of assembling the surface heater to a first case by using a fixing unit according to an embodiment, in the refrigerator according to an embodiment of the disclosure.

FIG. 5 is an exploded perspective view illustrating the heater assembly of the refrigerator according to one embodiment of the disclosure, and FIG. 6 is a view illustrating a process of assembling the surface heater to a first case by using a fixing unit according to a first embodiment, in the refrigerator according to one embodiment of the disclosure. For reference, FIG. 5 is an exploded perspective view of a part of the heater assembly 100, that is, the first case 110 and the surface heater 130. In addition, FIG. 5 illustrates a heater assembly 100 to which a fixing unit 150 according to the first embodiment is applied. By the fixing unit 150, the surface heater 130 may be fixed not only to the inner surface of the first case 110 in which the coupling protrusion 111 is formed, but also to the inner surface of the second case 120 in which the coupling groove 121 is formed. Hereinafter a case in which the surface heater 130 is fixed to the inner surface of the first case 110 by the fixing unit 150 will be mainly described.

As illustrated in FIGS. 5 and 6, the fixing unit 150 may include a plurality of fixing unit 150. The coupling protrusion 111 may include a plurality of coupling protrusions 111.

The plurality of fixing units 150 may be located outside the plurality of coupling protrusions 111 in the left and right direction Y of the refrigerator 1. For reference, the coupling groove 121 may include a plurality of coupling grooves 121. The plurality of coupling grooves 121 may be provided to correspond to the plurality of coupling protrusions 111.

The surface heater 130 may further include a plurality of fixing holes 136 formed in each corner of the surface heater 130 to be coupled to each of the plurality of fixing units 150.

The surface heater 130 may further include a plurality of coupling holes 138 provided to be coupled to each of the plurality of coupling protrusions 111. The plurality of coupling protrusions 111 may be through-coupled to the plurality of coupling holes 138. In response to that the surface heater 130 is fixed to the inner surface of the second case 120 by the fixing unit 150, the plurality of coupling grooves 121 may be through-coupled to the plurality of coupling holes 138.

The surface heater 130 may be fixed to the inner surface of the first case 110 in a sliding manner. In other words, the plurality of fixing holes 136 of the surface heater 130 may be coupled to the plurality of fixing units 150 in the sliding manner.

Each of the plurality of fixing units 150 may include a body 151 provided to extend from at least one of the inner surface of the first case 110 and the inner surface of the second case 120. The body 151 may be formed to extend in the up and down direction Z of the refrigerator 1 from at least one of the inner surface of the first case 110 and the inner surface of the second case 120.

Each of the plurality of fixing units 150 may further include a first wing 152 provided to extend from the body 151 to face the outside of the accommodation space, and spaced apart from the at least one of the inner surface of the first case 110 and the inner surface of the second case 120 from which the body 151 extends.

Each of the plurality of fixing units 150 may further include a second wing 153 provided to extend from the body 151 to face the inside of the accommodation space, and spaced apart from the at least one of the inner surface of the first case 110 and the inner surface of the second case 120 from which the body 151 extends.

The first wing 152 may extend from the body 151 toward the outside of the accommodation space in the left and right direction Y of the refrigerator 1. The second wing 153 may extend from the body 151 toward the inside of the accommodation space in the left and right direction Y of the refrigerator 1.

A distance d1 between the first wing 152, and the at least one of the inner surface of the first case 110 and the inner surface of the second case 120 from which the body 151 extends may be different from a distance d2 between the second wing 153, and the at least one of the inner surface of the first case 110 and the inner surface of the second case 120 from which the body 151 extends. Particularly, the distance d1 between the first wing 152, and the at least one of the inner surface of the first case 110 and the inner surface of the second case 120 from which the body 151 extends may be less than the distance d2 between the second wing 153, and the at least one of the inner surface of the first case 110 and the inner surface of the second case 120 from which the body 151 extends.

The distance d1 between the first wing 152, and the at least one of the inner surface of the first case 110 and the inner surface of the second case 120 from which the body 151 extends may be gradually increased in the left and right direction Y from the body 151 toward the outside of the accommodation space. The distance d2 between the second wing 153, and the at least one of the inner surface of the first case 110 and the inner surface of the second case 120 from which the body 151 extends may be gradually increased in the left and right direction Y from the body 151 toward the inside of the accommodation space.

The surface heater 130 may further include a fixing hole edge 137 provided to define each of the plurality of fixing holes 136. A separation of the surface heater 130 from the fixing unit 150 may be limited by interference between any one of the first wing 152 and the second wing 153 of the plurality of fixing units 150, and the fixing hole edge 137 of the surface heater 130.

Hereinafter a process of fixing the surface heater 130 to the inner surface of the first case 110 using the fixing unit 150 will be described.

As illustrated in FIG. 6, part (a), the surface heater 130 is closed to the first case 110 to allow the plurality of fixing holes 136 formed in the surface heater 130 to be coupled to the plurality of fixing units 150 formed on the inner surface of the first case 110.

As illustrated in FIG. 6, part (b), some of the plurality of fixing holes 136 of the surface heater 130 are coupled to some of the plurality of fixing units 150 of the first case 110. Particularly, the plurality of fixing holes 136 may include a first fixing hole 136a positioned on the left side in the left and right direction Y of the refrigerator 1 and a second fixing hole 136b positioned on the right side in the left and right direction Y of the refrigerator 1. The plurality of fixing units 150 may include a first fixing unit 150a positioned on the left side in the left and right direction Y of the refrigerator 1 and a second fixing unit 50b positioned on the right side in the left and right direction Y of the refrigerator 1. The first fixing hole 136a of the surface heater 130 may be coupled to the first fixing unit 150a of the first case 110. At this time, the second fixing hole 136b of the surface heater 130 may be not coupled to the second fixing unit 150b of the first case 110 due to interference between the fixing hole edge 137 of the second fixing hole 136b of the surface heater 130 and the first wing 152 of the second fixing unit 150b of the first case 110.

As illustrated in FIG. 6, part (c), in a state in which the first fixing hole 136a of the surface heater 130 is coupled to the first fixing unit 150a of the first case 110, the surface heater 130 is slid in the left and right direction Y of the refrigerator 1. Particularly, in the state in which the first fixing hole 136a of the surface heater 130 is coupled to the first fixing unit 150a of the first case 110, the surface heater 130 is slid in the left and right direction Y of the refrigerator 1 until the fixing hole edge 137 of the second fixing hole 136b of the surface heater 130 and the first wing 152 of the second fixing unit 150b of the first case 110 do not interfere with each other. In another aspect, in the state in which the first fixing hole 136a of the surface heater 130 is coupled to the first fixing unit 150a of the first case 110, the surface heater 130 is slid in the left and right direction Y of the refrigerator 1 until the fixing hole edge 137 of the first fixing hole 136a interferes with the second wing 153 of the first fixing unit 150a of the first case 110. The fixing hole edge 137 of the first fixing hole 136a may be caught in a gap between the second wing 153 of the first fixing unit 150a and the first case 110, thereby interfering with the second wing 153 of the first fixing unit 150a of the first case 110.

As illustrated in FIG. 6, part (d), in the state in which the first fixing hole 136a of the surface heater 130 is coupled to the first fixing unit 150a of the first case 110, when the surface heater 130 is slid in the left and right direction Y of the refrigerator 1 to allow the second fixing hole 136b of the surface heater 130 to be in a position corresponding to the second fixing unit 150b of the first case 110, the second fixing hole 136b of the surface heater 130 is coupled to the second fixing unit 150b.

As illustrated in FIG. 6, part (e), in response to that the first fixing hole 136a of the surface heater 130 is coupled to the first fixing unit 150a of the first case 110 and the second fixing hole 136b of the surface heater 130 is coupled to the second fixing unit 150b of the first case 110, the surface heater 130 may be slid in the left and right direction Y of the refrigerator 1 to allow the fixing hole edge 137 of the first fixing hole 136a of the surface heater 130 to interfere with the first fixing unit 150a of the first case 110 and to allow the fixing hole edge 137 of the second fixing hole 136b of the surface heater 130 to interfere with the second fixing unit 150b of the first case 110. It is appropriate that the surface heater 130 may be slid in the left and right direction Y of the refrigerator 1 to allow the fixing hole edge 137 of the first fixing hole 136a of the surface heater 130 to interfere with the second wing 153 of the first fixing unit 150a of the first case 110 and to allow the fixing hole edge 137 of the second fixing hole 136b of the surface heater 130 to interfere with the first wing 152 of the second fixing unit 150b of the first case 110. Due to the interference between the plurality of fixing holes 136 and the plurality of fixing units 150, the surface heater 130 may be fixed to the inner surface of the first case 110 without being separated from the inner surface of the first case 110.

As illustrated in FIG. 6, part (e), in response to that the surface heater 130 is fixed to the inner surface of the first case 110, the plurality of fixing holes 136 may be coupled to the plurality of fixing units 150, and the plurality of coupling holes 138 may be coupled to the plurality of coupling protrusions 111.

Figure 7:
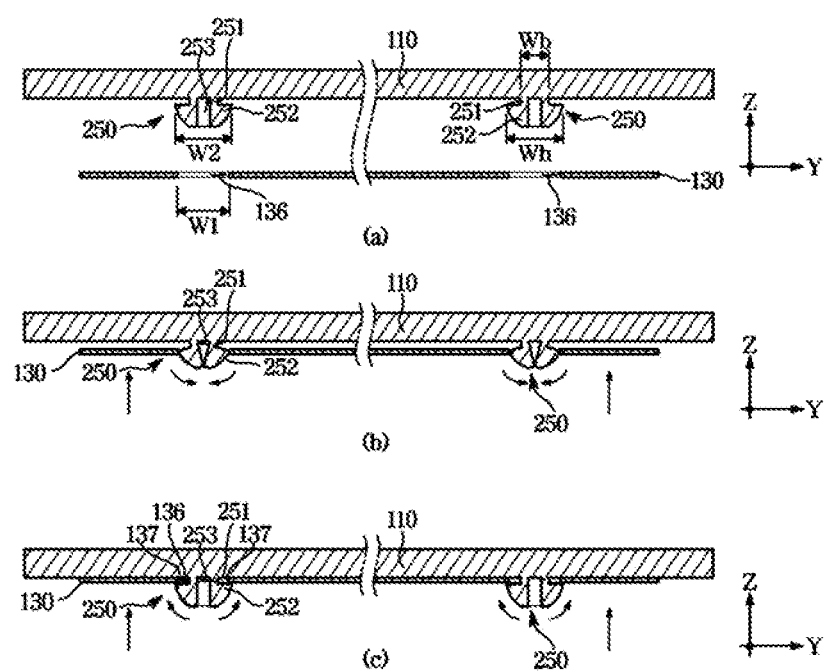
FIG. 7 is a view illustrating a process of assembling the surface heater to the first case by using a fixing unit according to an embodiment, in the refrigerator according to an embodiment of the disclosure.

FIG. 7 is a view illustrating a process of assembling the surface heater to the first case by using a fixing unit according to a second embodiment, in the refrigerator according to one embodiment of the disclosure. By a fixing unit 250, the surface heater 130 may be fixed not only to the inner surface of the first case 110 in which the coupling protrusion 111 is formed but also to the inner surface of the second case 120 in which the coupling groove 121 is formed. Hereinafter a case in which the surface heater 130 is fixed to the inner surface of the first case 110 by the fixing unit 250, will be mainly described. Hereinafter descriptions the same as those described with reference to FIGS. 1 to 6 will be omitted.

As illustrated in FIG. 7, the plurality of fixing holes 136 of the surface heater 130 may be through-coupled to the plurality of fixing units 250.

A width w1 of the plurality of fixing holes 136 may be less than a width w2 of the plurality of fixing units 250 to allow the plurality of fixing units 250 to be elastically deformed and to be through-coupled to the plurality of fixing holes 136.

Each of the plurality of fixing units 250 may include a body 251 provided to extend from at least one of an inner surface of the first case 110 and an inner surface of the second case 120. The body 251 may be formed to extend in the up and down direction Z of the refrigerator 1 from at least one of the inner surface of the first case 110 and the inner surface of the second case 120.

Each of the plurality of fixing units 250 may further include a head 252 provided to extend from the body 251 to have a width wh greater than a width wb of the body 251.

The head 252 may extend from the body 251 in the up and down direction Z of the refrigerator 1.

Each of the plurality of fixing units 250 may include a hollow 253. The hollow 253 may be formed over the head 252 and the body 251. The plurality of fixing units 250 may be easily elastically deformed due to the hollow 253.

The surface heater 130 may further include the fixing hole edge 137 provided to define each of the plurality of fixing holes 136.

A separation of the surface heater 130 from the fixing unit 250 may be limited by interference between the head 252 of the plurality of fixing units 250 and the fixing hole edge 137 of the surface heater 130.

Hereinafter a process of fixing the surface heater 130 to the inner surface of the first case 110 using the fixing unit 250 will be described.

As illustrated in FIG. 7, part (a), the surface heater 130 is closed to the first case 110 to allow the plurality of fixing holes 136 formed in the surface heater 130 to be coupled to the plurality of fixing units 250 formed on the inner surface of the first case 110.

As illustrated in FIG. 7, part (b), the plurality of fixing holes 136 of the surface heater 130 is coupled to the plurality of fixing units 250 of the first case 110. The head 252 of the plurality of fixing units 250 of the first case 110 may be retracted in an inner direction of the heads 252 and pass through the plurality of fixing holes 136 of the surface heater 130.

As illustrated in FIG. 7, part (c), after passing through the plurality of fixing holes 136 of the surface heater 130, the head 252 of the plurality of fixing units 250 of the first case 110 may be returned to its original state due to the elastic deformation. By the interference between the head 252 of the plurality of fixing units 250 and the fixing hole edge 137 of the surface heater 130, the surface heater 130 may be fixed to the inner surface of the case 110 without being separated from the inner surface of the first case 110.

In the above, the case in which the surface heater 130 is fixed to at least one of the inner surface of the first case 110 and the inner surface of the second case 120 by the fixing units 150 and 250 has been described. However, the surface heater 130 may be fixed to at least one of the inner surface of the first case 110 and the inner surface of the second case 120 without being coupled to the fixing units 150 and 250. As an example, the surface heater 130 may be in close contact with at least one of the inner surface of the first case 110 and the inner surface of the second case 120 by the insulating material 140 filled in the accommodation space. In this case, the surface heater 130 may be fixed to at least one of the inner surface of the first case 110 and the inner surface of the second case 120 even without a separate adhesive or fixing units 150 and 250.

In the above, the case in which the heater assembly 100 is installed to heat the storage compartment 30 has been described. However, the use of the heater assembly 100 is not limited to the above example. As an example, the heater assembly 100 may be installed in the refrigerator 1 not only for heating the storage compartment 30, but also for various purposes such as preventing dew formation caused by opening and closing of the door.

While the disclosure has been particularly described with reference to example embodiments, it should be understood by those of skilled in the art that various changes in form and details may be made without departing from the spirit and scope of the disclosure.

The invention claimed is:

1. A refrigerator comprising:
   a main body;
   a storage compartment disposed inside the main body; and
   a heater assembly to partition the storage compartment into a first storage compartment and a second storage compartment adjacent to the first storage compartment, the heater assembly including:
   a first case which defines a surface of the first storage compartment;
   a second case coupled to the first case to form an accommodation space with the first case, and which defines a surface of the second storage compartment;
   a coupling protrusion formed on one of the first case and the second case;
   a coupling groove formed on another one of the first case and the second case, and coupled to the coupling protrusion;
   a surface heater disposed on at least one of an inner surface of the first case and an inner surface of the second case, the surface heater including;
   a film and a heating wire printed on the film-; and
   an insulating material filled in the accommodation space to allow the surface heater to be in close contact with at least one of the inner surface of the first case and the inner surface of the second case.

2. The refrigerator of claim 1, wherein the first case and the second case are injection molded products.

3. The refrigerator of claim 1, wherein the insulating material includes expanded polystyrene.

4. The refrigerator of claim 1, wherein the coupling protrusion is integrally formed with the one of the first case and the second case, and
   the coupling groove is integrally formed with the another one of the first case and the second case.

5. The refrigerator of claim 4, wherein the coupling protrusion includes a hollow.

6. The refrigerator of claim 4, wherein the coupling protrusion includes a plurality of coupling protrusions,
   the coupling groove includes a plurality of coupling grooves, and
   the plurality of coupling grooves corresponds to the plurality of coupling protrusions, respectively.

7. The refrigerator of claim 6, wherein the surface heater further includes a plurality of coupling holes to be coupled to each of the plurality of coupling protrusions.

* * * * *